United States Patent
Matsumoto

(10) Patent No.: US 7,639,867 B2
(45) Date of Patent: Dec. 29, 2009

(54) MEDICAL IMAGE GENERATING APPARATUS AND METHOD, AND PROGRAM

(75) Inventor: Kazuhiko Matsumoto, Tokyo (JP)

(73) Assignee: Ziosoft, Inc., Tokyo (JP)

( * ) Notice: Subject to any disclaimer, the term of this patent is extended or adjusted under 35 U.S.C. 154(b) by 1018 days.

(21) Appl. No.: 10/913,885

(22) Filed: Aug. 6, 2004

(65) Prior Publication Data

US 2005/0065425 A1    Mar. 24, 2005

(30) Foreign Application Priority Data

Sep. 19, 2003    (JP)    ............................. 2003-327863

(51) Int. Cl.
G06K 9/00    (2006.01)
(52) U.S. Cl. .................................... 382/154
(58) Field of Classification Search ................. 382/154; 128/922
See application file for complete search history.

(56) References Cited

U.S. PATENT DOCUMENTS

| | | | |
|---|---|---|---|
| 4,835,712 A | 5/1989 | Drebin et al. | |
| 5,499,323 A | 3/1996 | Doi et al. | |
| 5,821,942 A | 10/1998 | Avila et al. | |
| 6,356,265 B1 | 3/2002 | Knittel et al. | |
| 6,369,816 B1 | 4/2002 | Knittel et al. | |
| 6,426,749 B1 | 7/2002 | Knittel et al. | |
| 6,483,507 B2 | 11/2002 | Osborne et al. | |
| 6,680,735 B1 | 1/2004 | Seiler et al. | |

FOREIGN PATENT DOCUMENTS

| | | | |
|---|---|---|---|
| JP | 01183687 A | * | 7/1989 |
| JP | H7-284090 | | 10/1995 |
| JP | 2002-312809 | | 10/2002 |
| JP | 2002312809 A | * | 10/2002 |
| JP | 2002-336241 | | 11/2002 |

OTHER PUBLICATIONS

The Visualization Toolkit ($2^{nd}$ Edition) An Object-Oriented Approach to 3D Graphics *Lisa Sobierajski Avila, Rick Avila, C. Charles Law.*
Introduction to Volume Rendering *Barthold Lichtenbelt, Randy Crane, Shaz Naqvi.*

* cited by examiner

*Primary Examiner*—Wenpeng Chen
*Assistant Examiner*—Soo Jin Park
(74) *Attorney, Agent, or Firm*—Howard & Howard Attorneys PLLC

(57) ABSTRACT

An image processing apparatus acquires voxel data obtained by imaging an interior of a living body by a modality and generates a three-dimensional medical image by volume rendering using a ray casting method. The image processing apparatus generates the three-dimensional medical image wherein shade of a surface of an inner wall of an intestinal tract is clearly displayed and an abnormal region invasively developed in the interior of the inner wall is distinguishably displayed based on color information corresponding to voxel data placed at a position shifted from the surface by a predetermined distance.

12 Claims, 11 Drawing Sheets

FIG.4

| VOXEL VALUE (CT VALUE) | COLOR VALUE | | | OPACITY VALUE (0.0-1.0) |
|---|---|---|---|---|
| | R | G | B | |
| -2,000 | **** | **** | **** | 0.0 |
| -1,999 | **** | **** | **** | 0.3 |
| -1,998 | **** | **** | **** | 1.0 |
| ⋮ | ⋮ | ⋮ | ⋮ | ⋮ |
| +1,000 | **** | **** | **** | 0.5 |

MEDICAL IMAGE GENERATING APPARATUS AND METHOD, AND PROGRAM

RELATED APPLICATIONS

This application claims priority to Japanese Application No. 2003-327863 filed Sep. 19, 2003.

BACKGROUND OF THE INVENTION

1. Field of the Invention

The present invention relates to a medical image generating apparatus that generates a three-dimensional image used in diagnostic imaging, imaging diagnostic system using the apparatus, medical image generating method and medical image generating program, and particularly to a medical image generating apparatus, which is suitable for diagnosis of an invasive abnormal region, and system, method and program.

2. Description of the Related Art

Conventionally, there is used imaging diagnostic in which a tomographic image of an interior of a human body is imaged by an imaging device (modality) such as a CT (Computed Tomography) scanner, an MRI (Magnetic Resonance Imaging) and the like and the result is used in diagnosis of disease. Also, such a method is established that a three-dimensional image of such as a predetermined internal organ, an organ and the like is generated from the obtained tomographic image to make a diagnosis. This method is contributed to a precise and accurate diagnosis.

In order to display the internal organ of the interior of the human body three-dimensionally, volume rendering is performed using a method, which is generally called "ray casting." Herein, the volume rendering means that a three-dimensional image is directly drawn from digital data of an object obtained by CT. In this "ray casting", a virtual light ray is projected to a voxel, which indicates a minute three-dimensional structural unit of an object. Then, reflected lights of all voxels where the light ray reaches are calculated and a pixel value (including, for example, a RGB value that is color information) of each pixel is obtained to generate a three-dimensional image. Moreover, as disclosed in Unexamined Japanese Patent KOKAI Publication No. 2002-312809, such a method is established that a gradient, which is obtained based on voxel values around the arrival point of the virtual light ray to draw a shadow on a surface and display a shape of the surface clearly.

FIG. 9 illustrates an example that an intestinal wall surface of an intestinal tract is displayed as a three-dimensional image by such method. As illustrated in the figure, since the shape of the surface is clearly displayed by a shading effect based on the gradient, for example, a polyp (regions shown by arrows in the figure) developed on the surface of the intestinal wall is clearly displayed. Accordingly, the diagnosis using the three-dimensional image generated by the aforementioned method is useful in discovering an abnormal region developed in the interior of the human body.

However, in the ray casting using the gradient, though the abnormal region on the surface can be clearly displayed, for example, an abnormal region developed invasively in the interior of tissue cannot be displayed. FIG. 10 shows an example in which an intestinal tract where an invasive abnormal region develops is displayed as a three-dimensional image using the aforementioned method. As illustrated in the figure, the invasive abnormal region cannot be confirmed on a screen.

In order to solve this problem, there is used a method in which an opacity value of the surface portion is reduced to display a portion lower than the surface at the time of performing volume rendering. FIG. 11 illustrates an example of a three-dimensional image generated by this method. As illustrated in this figure, the invasive abnormal region is distinguishably displayed in a gray scale (a region shown by an arrow in the figure). However, as recognized by comparison between FIG. 11 and FIG. 10, according to this method, drawing of the surface portion becomes unclear and the shape of the surface is not clearly displayed. In other words, though the invasive abnormal region is clearly displayed, there occurs such trouble that the polyp and the like on the surface are not displayed. Accordingly, for example, there is need to generate multiple images based on the volume rendering of voxels each having a different opacity value. Or, the opacity value of the voxel must be changed according to the position of the presence of the abnormal region to be displayed at the time of executing the volume rendering. Namely, complicated working and much time are required, preventing a rapid diagnosis.

SUMMARY OF THE INVENTION

An object of the preset invention is to provide a medical image generating apparatus that appropriately displays an abnormal region, medical image processing method, and program.

In order to attain the above object, a medical image generating apparatus according to a first aspect of the present invention is a medical image generating apparatus that generates a three-dimensional medical image by a ray casting method in which volume data including voxel values obtained by imaging an interior of a living body is acquired to calculate a reflected light of a light ray with which the volume data is virtually irradiated. The medical image generating apparatus includes a shading section that performs shading with an irradiation of the light ray at an arrival position of the virtual light ray. The medical image generating apparatus further includes a shift position specifying section that specifies a position spaced and shifted from the arrival position of the virtual light ray. The medical image generating apparatus further includes a gradation information obtaining section that obtains gradation information of the shift position specified by the shift position specifying section. The medical image generating apparatus further includes an image generating section that generates a three-dimensional medical image based on a shading result obtained by the shading section and gradation information obtained by the gradation information obtaining section.

The medical image generating apparatus may further include at least a gradation information setting section that brings gradation information into correspondence with the voxel value of volume data. In this case, the shift position specifying section preferably obtains a voxel value corresponding to the shift position. The gradation information obtaining section preferably obtains gradation information, which is made to correspond to the voxel value obtained by the shift position specifying section.

In the medical image generating apparatus, the shading section may further include a gradient calculating section that calculates a gradient of the arrival position of the virtual light ray. The shading section may further include a shading coefficient calculating section that calculates a shading coefficient based on the gradient calculated by the gradient calculating section.

In this case, the image generating section preferably generates a three dimensional image based on the shading coefficient calculated by the shading coefficient calculating section and the gradation information obtained by the gradation information obtaining section.

The medical image generating apparatus may further include a storage section that stores information in which correspondence is made by the gradation information setting section.

In the medical image generating apparatus, the gradation information may be color information. In this case, the gradation information setting section may further include a display color setting section that sets a display color for displaying an invasive abnormal region. The gradation information setting section may further include a color information updating section that updates color information, which is made to correspond to the voxel value of volume data included in the invasive abnormal region, based on the display color set by the display color setting section.

In order to attain the above object, a medical image generating method according to a second aspect of the present invention is a medical image generating method that generates a medical image three-dimensionally showing an interior of a living body by a ray casting method using a computer. The medical image generating method includes the voxel data obtaining step of obtaining voxel data obtained by imaging the interior of the living body. The medical image generating method further includes the image generating step of generating a three-dimensional image of an imaged diagnosing region by ray casting that virtually irradiates the voxel data with a light ray. In the image generating step, a three-dimensional image, which distinguishably displays an invasive abnormal region developed in an imaged diagnosing interior, is generated using gradation information of the voxel data irradiated with the virtual light ray based on a position shifted in an irradiation direction of the light ray.

The medical image generating method may further include at least the step of storing a voxel value of voxel data and gradation information to be made to correspond to each other in advance. The medical image generating method may further include at least the step of setting a display color of the invasive abnormal region. The medical image generating method may further include at least the step of updating the gradation information that is made to correspond to the voxel value of voxel data included in the invasive abnormal region based on the set display color. In this case, in the image generating step, preferably, the invasive abnormal region is distinguishably displayed based on the updated gradation information.

BRIEF DESCRIPTION OF THE DRAWINGS

These objects and other objects and advantages of the present invention will become more apparent upon reading of the following detailed description and the accompanying drawings in which:

FIG. 4 illustrates an example of a Look Up Table stored in a storage section of an image processing apparatus illustrated in FIG. 3;

DETAILED DESCRIPTION OF THE PREFERRED EMBODIMENT

Figure 1:
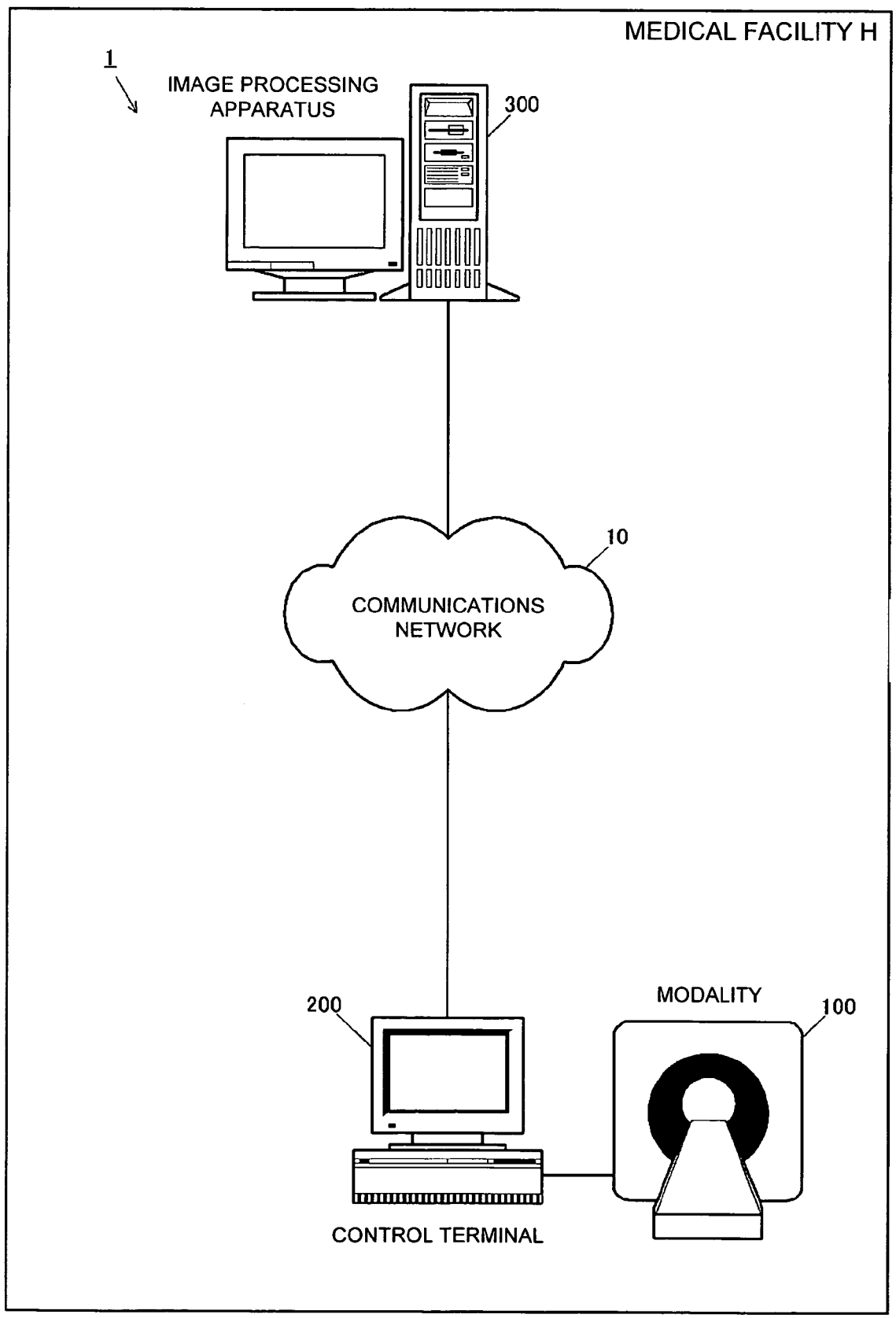
FIG. 1 is a view schematically illustrating a configuration of an imaging diagnostic system according to an embodiment of the present invention.

FIG. 1 is a view schematically illustrating a configuration of an imaging diagnostic system according to an embodiment of the present invention applicable to diagnostic imaging used in medical facilities. As illustrated in the figure, an imaging diagnostic system 1 includes a communications network 10, a modality 100, a control terminal 200, and an image processing apparatus 300.

The communications network 10 is a communications network that connects the control terminal 200 to the image processing apparatus 300 in a medical facility H to carry out information transmission therebetween. The communications network 10 carries out information transmission based on a predetermined communication protocol such as DICOM (Digital Imaging and Communications in Medicine) and the like.

The modality 100 is an imaging device that images an interior of a human body, and for example, a CT scanner (Computed Tomographic apparatus), a helical CT, an MRI (magnetic resonance imaging), a PET (Positron Emission Tomographic apparatus) and the like can be considered. Herein, the modality 100 is a CT scanner that images a tomographic image of the interior of the human body using an X-ray.

The modality 100 (CT scanner) is controlled by the control terminal 200 to be described later to image a tomographic image (slice) of an interior (interior of a living body) of a patient and a medical examinee (they are hereinafter referred to as medical examinee). Herein, information indicating the tomographic image includes a CT value that is an X-ray absorption coefficient. The modality 100 and the control terminal 200 are connected to each other by a connection method based on a medical image communication standard such as DICOM and the like.

The control terminal 200 includes an information processing apparatus such as a workstation and like. The control terminal 200 controls an operation of the modality 100 and acquires image data (original data) obtained by the modality 100.

Figure 2:
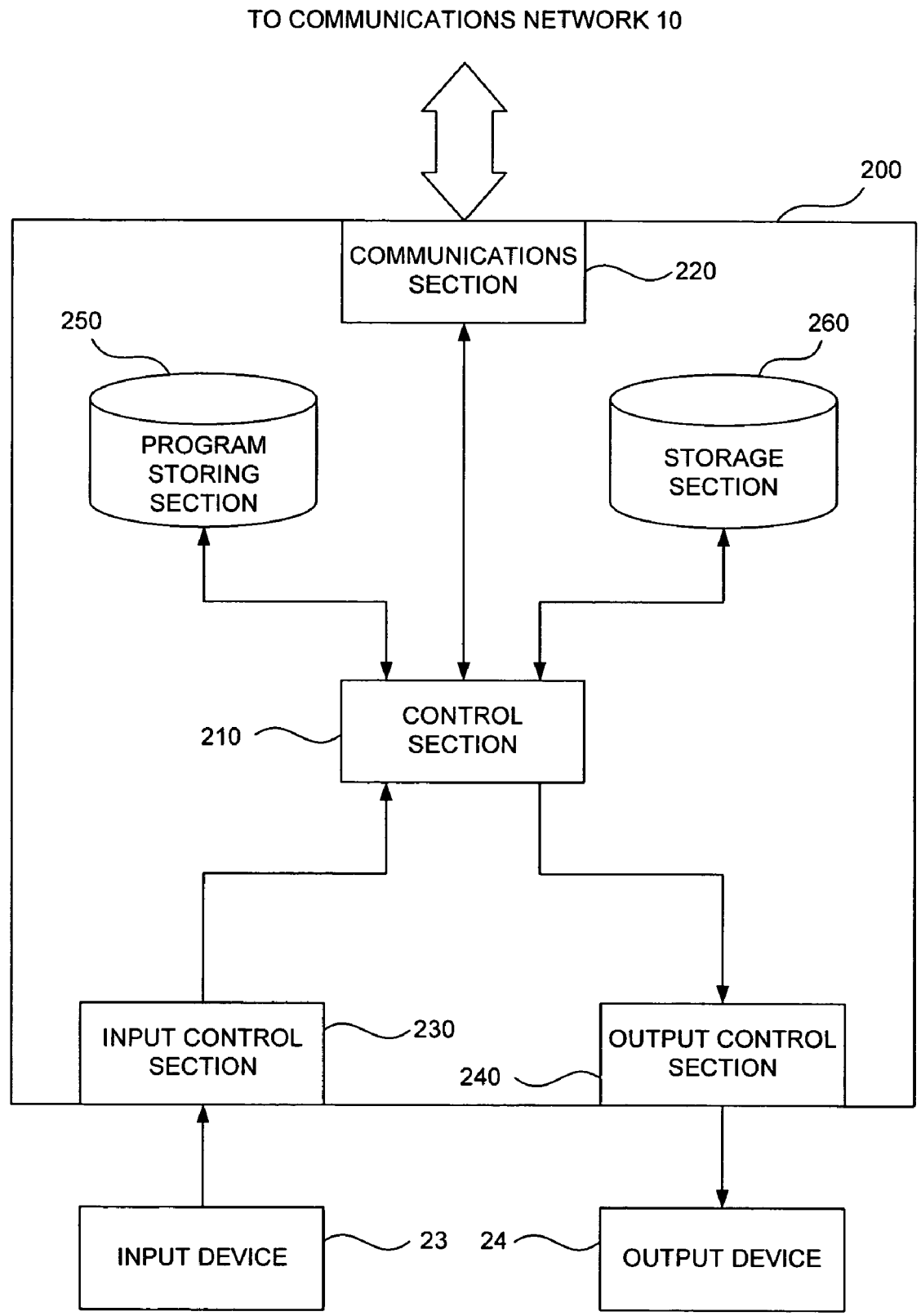
FIG. 2 is a block diagram illustrating a configuration of a control terminal illustrated in FIG. 1.

A configuration of the control terminal 200 will be explained with reference to FIG. 2. As illustrated in the figure, the control terminal 200 includes a control section 210, a communications section 220, an input control section 230, an output control section 240, a program storing section 250, and a storage section 260.

The control section 210 includes a CPU (Central Processing Unit) and a storage device for example, RAM (Random Access Memory) that provides a work area. The control section 210 controls each section of the control terminal 200 to execute processing to be described later based on a predetermined operation program stored in the program storing section 250.

The communications section 220 includes a communications device such as an NIC (Network Interface Card). The communications section 220 is connected to the modality 100 and the image processing apparatus 300 via the communications network 10, respectively, to execute communications between the modality 100 and the image processing apparatus 300.

The input control section 230 is connected to an input device 23 such as a keyboard, a pointing device and the like, and sends an input instruction corresponding to the operation of the input device 23 to the control section 210.

The output control section 240 is connected to an output device 24 such as a display device, a printer and the like, and outputs a result of an executed processing to the output device 24 according to an instruction from the control section 210.

The program storing section 250 includes storage devices such as a hard disk device, a ROM (Read Only Memory) and the like. The program storing section 250 stores various kinds of programs that are executed by the control section 210. The programs to be stored in the program storing section 250 include the following operation programs, which are operated on an OS (Operating System) together with the OS that controls a basic operation of the control terminal 200 and execute processing to be described later. Namely, these operation programs are as follows:

(1) a modality control program; a program for controlling the modality 100; and (2) a communication program; a program for controlling the communications section 220 to perform communications with the modality 100 and communications with the image processing apparatus 300 via the communications network 10.

Processing in the control terminal 200 is achieved by executing these operation programs by the control section 210.

The storage section 260 includes storage devices such as a RAM, a hard disk device and the like. The storage section 260 stores image data obtained by the modality 100.

Herein, image data (original data) obtained by the modality 100 indicates three-dimensional volume data of an image area. The three-dimensional volume data includes coordinate data of the relevant area and voxel values at the respective coordinates. In this embodiment, since the modality 100 is the CT scanner, a CT value is used as a voxel value. Herein, the CT value is a value indicating an X-ray absorption coefficient. As described later, the image processing apparatus 300 calculates a pixel value based on the CT value to generate an image. In this case, since a difference in the CT value generates a difference in brightness of the image, the image processing apparatus 300 can generate a three-dimensional image of the interior of the living body (hereinafter referred to as three-dimensional medical image).

An explanation will be next given of the image processing apparatus 300. The image processing apparatus 300 is an information processing apparatus such as a workstation and like, and generates a three-dimensional medical image using image data (three-dimensional volume data) obtained from the control terminal 200.

Figure 3:
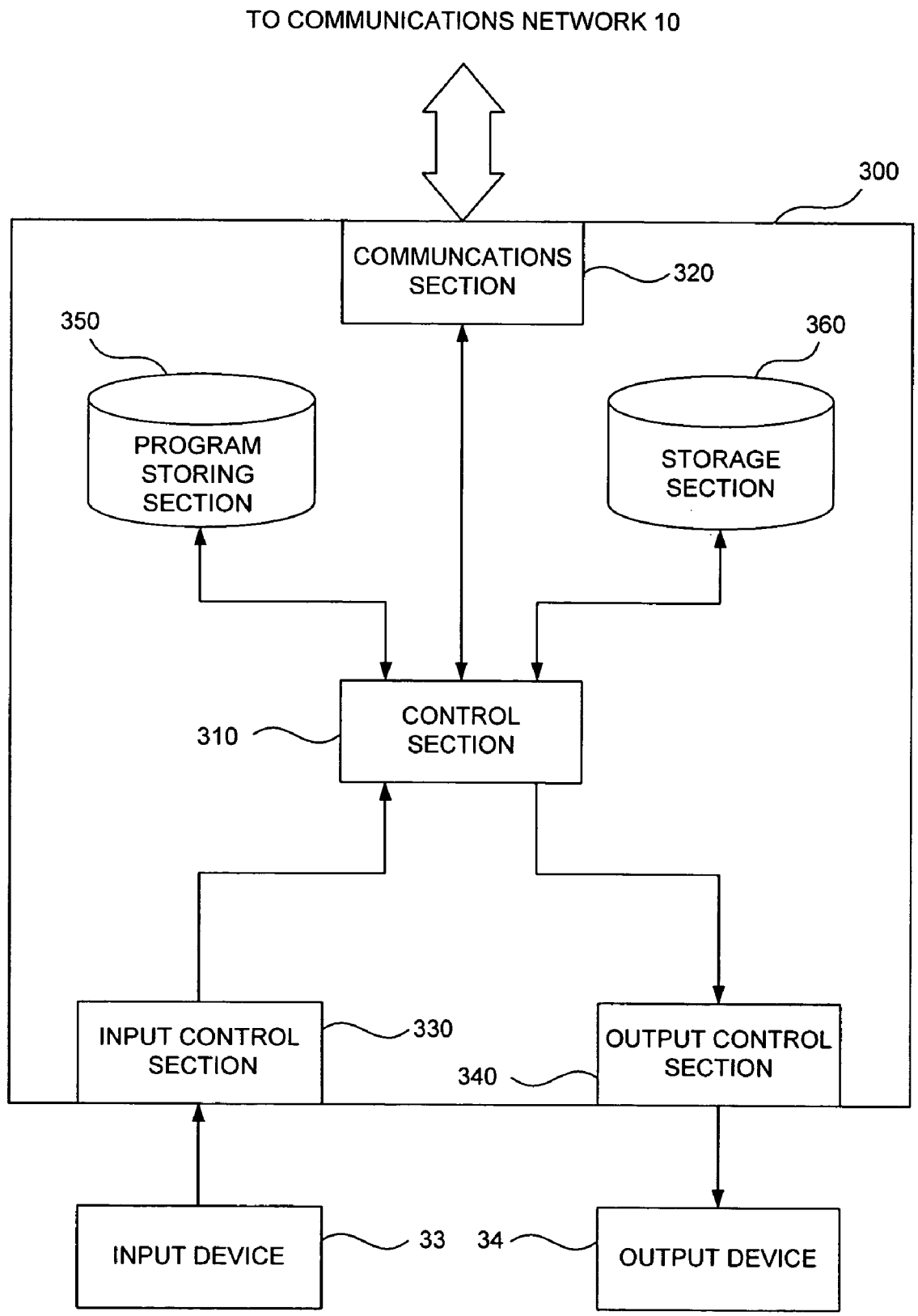
FIG. 3 is a block diagram illustrating a configuration of an image processing apparatus illustrated in FIG. 1.

FIG. 3 is a block diagram illustrating a configuration of the image processing apparatus 300. As illustrated in the figure, the image processing apparatus 300 includes a control section 310, a communications section 320, an input control section 330, an output control section 340, a program storing section 350, and a storage section 360.

The control section 310 includes a CPU and a storage device (RAM and the like) that provides a work area. The control section 310 controls each section of the control terminal 300 to execute processing to be described later based on an operation program stored in the program storing section 350.

The communications section 320 includes a communications device such as an NIC. The communications section 320 is connected to the communications network 10 and performs communications with the control terminal 200.

The input control section 330 is connected to an input device 33 such as a keyboard, a pointing device and the like, and sends an input instruction corresponding to the operation of the input device 33 and information stored in each database to the control section 310.

The output control section 340 is connected to an output device 34 such as a display device, a printer and the like, and outputs a result of an executed processing to the output device 34 according to an instruction from the control section 310.

The program storing section 350 includes storage devices such as a hard disk device, a ROM and the like. The program storing section 350 stores various kinds of programs that are executed by the control section 310. The programs to be stored in the program storing section 350 include the following operation programs, which are operated on OS together with the OS that controls a basic operation of the image processing apparatus and execute processing to be described later. Namely, these operation programs are as follows:

(1) a communications program; a program for controlling the communications section 320 to perform communications with the control terminal 200 via the communications network 10;

(2) an input/output control program; a program for controlling input and output to/from the storage section 360; and (3) an image processing program; a program for which the control terminal 200 performs image processing to image data obtained from the modality 100 to generate a three-dimensional medical image.

The storage section 360 includes storage devices such as a semiconductor storage device, and a rewritable storage device such as a hard disk device. The storage section 360 stores a Look-Up Table (hereinafter referred to as LUT) where a color value (a RGB value that designates a color gradation) and an opacity ("opacity value") are made to correspond to the voxel values of image data, data obtained in each processing, and generated three-dimensional medical image.

An example of LUT stored in the storage section 360 is illustrated in FIG. 4. As illustrated in the figure, in the LUT, for example, the color value, which shows a value of a color element for each of RGB, and the "opacity value", which shows the opacity, are made to correspond to each other for each CT value (voxel value) corresponding to the range of the CT value obtained when the interior of the human body is imaged.

Herein, correspondence between the CT value and the color value can be arbitrarily set. Namely, an approximate CT value, which is obtained for each substance that forms the interior of the human body, is predetermined. Accordingly, color information corresponding to the CT value of a diagnosing region is preset, making it possible to display the diagnosing region with an arbitrary color tone. For example, in the case of displaying a "bone" is displayed with a red tone, a RGB value corresponding to a CT value of the bone is set to a red tone in order to display pixels corresponding to the bone with a red tone. Similarly, a RGB value corresponding to a CT value of an abnormal region developed in a diagnosing area is appropriately set, making it possible to display the abnormal region with an arbitrary color tone to be distinguishable with the other region. In this case, the image processing apparatus 300 displays a color sample to be used in a color displaying, and causes an operator to select a desired color. The control section 310 of the image processing apparatus 300 sets a color value corresponding to each CT value in order to display the abnormal region with a designated color tone according to the CT value of the abnormal region developed in the diagnosing object.

Moreover, the "opacity value" can be arbitrarily set since a diagnosing region to be displayed is different depending on the contents of diagnosis. For example, when air is not displayed, an "opacity value" corresponding to a CT value of air is set to 0.

An explanation will be next given of the imaging diagnostic system 1 according to this embodiment.

Figure 5:
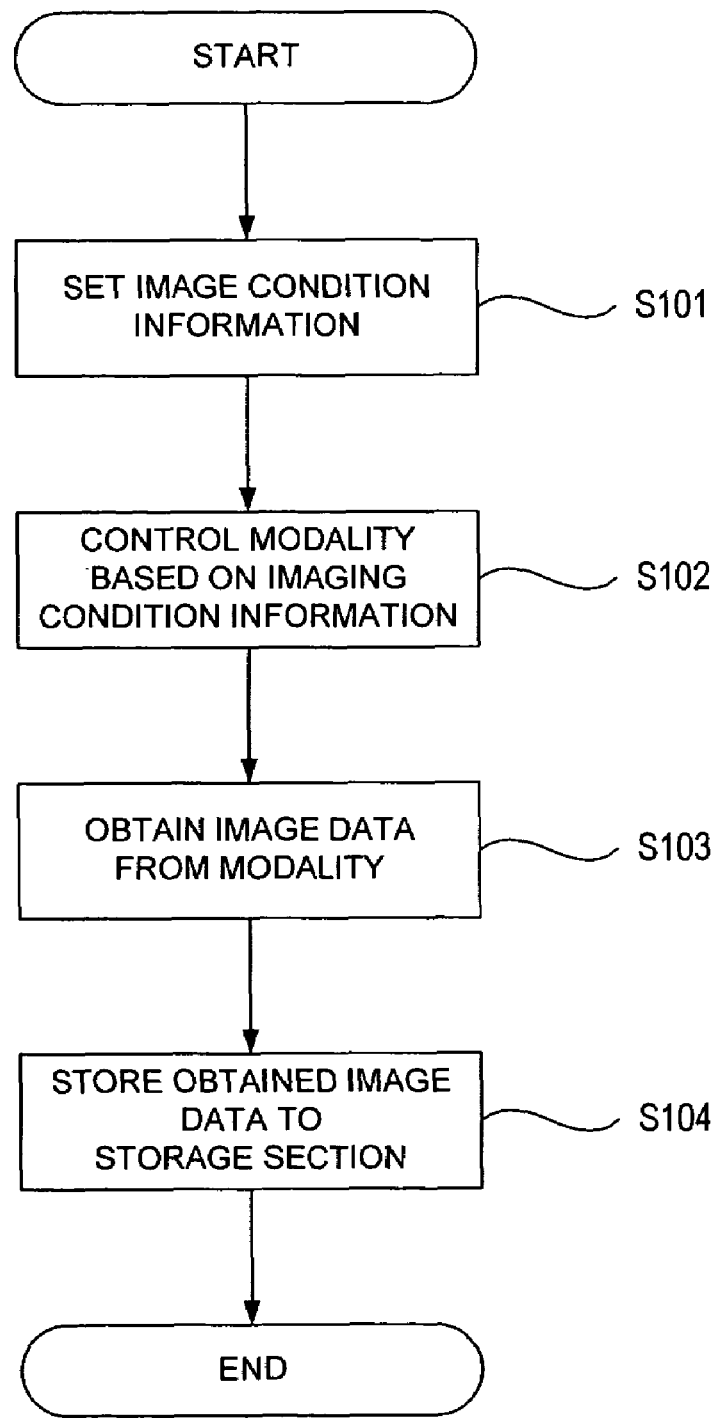
FIG. 5 is a flowchart explaining an image processing according to an embodiment of the present invention.

First, image processing according to this embodiment will be explained with reference to FIG. 5. In the image processing, the modality 100 obtains a tomographic image of the interior of the human body in connection with the medical examinee upon reception of the instruction from the control terminal.

Before imaging, the control terminal 200 sets information indicating an imaging condition according to an input from the operator (step S101). More specifically, information relating to designation of an imaging area, the use or non-use of a contrast agent and the like is set.

The control terminal 200 controls the operation of the modality 100 according to the imaging condition set in step S101 (step S102). In other words, the modality 100 executes an imaging operation based on the imaging condition by the control of the control terminal 200. As a result, the modality 100 obtains image data (three-dimensional volume data) in the set imaging area.

The control terminal 200 acquires image data obtained by the modality 100 from the modality 100 after completing the imaging operation of the modality 100 (step S103). The control terminal 200 stores the obtained image data to the storage section 260 (step S104), and ends the processing.

In the present invention, the image processing apparatus 300 generates a three-dimensional medical image based on the "ray casting" method using image data obtained in the aforementioned imaging processing.

Figure 6:
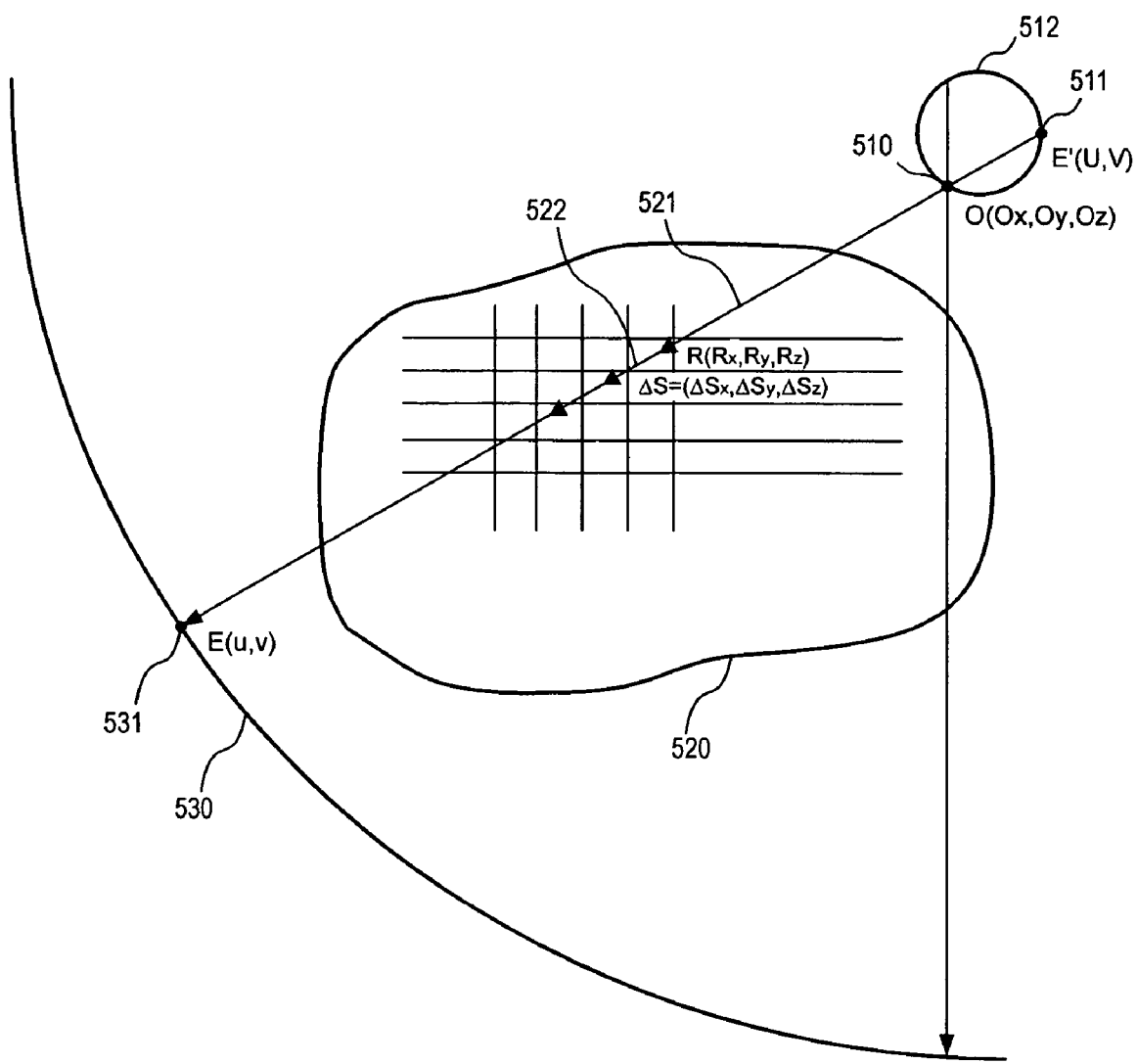
FIG. 6 explains a concept of "ray casting" by a perspective projection used in an embodiment of the present invention.

The following will explain a schematic process by which the three-dimensional medical image is generated based on the "ray casting" method with reference to FIG. 6. In FIG. 6, an arbitrary origin O ($O_x$, $O_y$, $O_z$), which is provided in a space, is shown by 510. A three-dimensional object, which is formed by volume data, is shown by 520. Reference numeral 530 shows a virtual projection plane on which a virtual reflected light is projected by the three-dimensional object of a virtual light ray irradiated from the arbitrary origin O.

In order to calculate the virtual reflected light along the virtual light ray (hereinafter referred to as ray) irradiated from the arbitrary origin O, ray arrival points are set at a fixed step interval. A ray vector leading to a ray arrival point R ($R_x$, $R_y$, $R_z$) from the origin O is shown by 521. A step vector $\Delta S = (\Delta S_x, \Delta S_y, \Delta S_z)$ indicating a step interval is shown by 522. A virtual reflected light E (u, v) projected onto an arbitrarily coordinate X (u, v) on a projection plane 530 is shown by 531. In this case, each of $R_x$, $R_y$, $R_z$ and $\Delta S_x$, $\Delta S_y$, $\Delta S_z$ becomes a function of a position (u, v) on the virtual projection plane.

In FIG. 6, the projection plane 530 exists in an arrival direction of the virtual light ray. Assuming that the origin O 521 is placed on a surface of a lens of a virtual eyeball, a virtual reflected light 511 as E'(U, V) is projected onto an arbitrary coordinate X' (U, V) on a retina 512 opposite to the eyeball. Namely, it can be considered that one, which is obtained by enlarging the virtual reflected light on the coordinate X' (U, V) in a rotation symmetric way with respect to the origin O 521, matches the virtual reflected light E (u, v) on the virtual projection plane 530.

Herein, it is assumed that a voxel positioned at an nth ray arrival point Rn on the virtual light ray is expressed by $V_n$ ($R_{xn}$, $R_{yn}$, $R_{zn}$).

An opacity given with respect to the voxel value is expressed as $\alpha$ ($R_{xn}$, $R_{yn}$, $R_{zn}$) that is used as a function of a position. A shading coefficient, which is obtained from a gradient of voxel data, is expressed as $\beta$ ($R_{xn}$, $R_{yn}$, $R_{zn}$) that is used as a function of a position, similarly. Moreover, when a remaining light, which the voxel $V_n$ obtains from voxel $V_{n-1}$, is expressed by $I_{n-1}$ and a remaining light, which is emitted from the voxel $V_n$, is expressed by $I_n$, a damped light $D_n$ of the voxel $V_n$ is expressed by the following equation 1.

$$D_n = \alpha(R_{xn}, R_{yn}, R_{zn}) \times I_{n-1} \qquad \text{(Eq. 1)}$$

Moreover, when gradation information corresponding to the voxel $V_n$ is expressed by $C_n$, a partially reflected light $F_n$, which is reflected from the voxel $V_n$, is defined by the following equation 2.

$$F_n = C_n \beta(R_{xn}, R_{yn}, R_{zn}) \times D_n \qquad \text{(Eq. 2)}$$

Equation 2 is transformed into equation 2' by substituting equation 1 into equation 2.

$$Fn = C_n \beta(R_{xn}, R_{yn}, R_{zn}) \times \alpha(R_{xn}, R_{yn}, R_{zn}) \times I_{n-1} \qquad \text{(Eq. 2')}$$

The remaining light $I_n$, which is emitted from the voxel $V_n$, is considered as one that is obtained by subtracting the damped light $D_n$ damped by the voxel $V_n$ from the remaining light $I_{n-1}$, which the voxel $V_n$ receives from voxel $V_{n-1}$, and the remaining light $I_n$ is expressed by the following equation 3.

$$I_n = V_{n-1} - D_n \qquad \text{(Eq. 3)}$$

Equation 3' is obtained by substituting equation 1 into equation 3 to rearrange the equation.

$$I_n = (1 - \alpha(R_{xn}, R_{yn}, R_{zn})) \times I_{n-1} \qquad \text{(Eq. 3')}$$

The virtual reflected light E (u, v) projected on the coordinate X (u, v) on the virtual projection plane 530 can be considered as one that is obtained by adding partially reflected lights of all voxels $V_0, V_1, \ldots V_n$ on the virtual light ray, and the virtual reflected light E is defined by the following equation 4.

$$E(u,v) = \Sigma(i=1; \text{terminal condition}) F_i \qquad \text{(Eq. 4)}$$

In this case, the terminal condition is decided by a final arrival position of the virtual light ray. Namely, when the virtual light ray passes through the object, the partially reflected lights $F_i$ of all voxels on the virtual light ray are added. When the remaining light of the virtual light ray reaches zero in the interior of the object, for example, the remaining light reaches zero at ith voxel $V_i$. In other words, when remaining light $I_i = 0$, the partially reflected lights $F_j$ (j=1, … i−1) leading to the voxel $V_i$ is added. Moreover, when equations 2 and 3 are substituted into equation 4 and the equation is rearranged, an initial value of the remaining light of the virtual light ray at the origin O is set to $I_0$ to obtain the following equation 4'.

$$E(u,v) = I_0 \times \Sigma(i=1; \text{terminal condition}) C_i \times$$

$$\beta(R_{xi}, R_{yi}, R_{zi}) \times \alpha(R_{xi}, R_{yi}, R_{zi}) \times$$

$$(\Pi(j=1; i-1)(1-\alpha(R_{xi}, R_{yi}, R_{zi}))) \qquad \text{(Eq. 4')}$$

In this way, the virtual reflected light E (u, v) of all coordinates X (u, v) on the virtual projection plane 530 is calculated, thereby forming a virtual three-dimensional perspective image.

Additionally, the above explained the process of the ray casting method using the perspective projection method. However, the virtual perspective image can be generated by a parallel projection method. Though the details thereof are omitted, the reflected light E is expressed by the following equation 5.

$$E(u, v) = I_0 \times (\Sigma(i=1; \text{terminal condition}) C_i \times \beta_i \times \alpha_i) \times$$

$$(\Pi(j=1; i-1)(1-\alpha_j)) \quad \text{(Eq. 5)}$$

In this case, $I_0$ is remaining light of the virtual light ray at the origin 0, $\alpha_i$ and $\alpha_j$ are opacities of ith and jth voxels on the virtual light ray, and $\beta_i$ is a shading coefficient obtained from the gradient of voxel data around the ith voxel.

Figure 7:
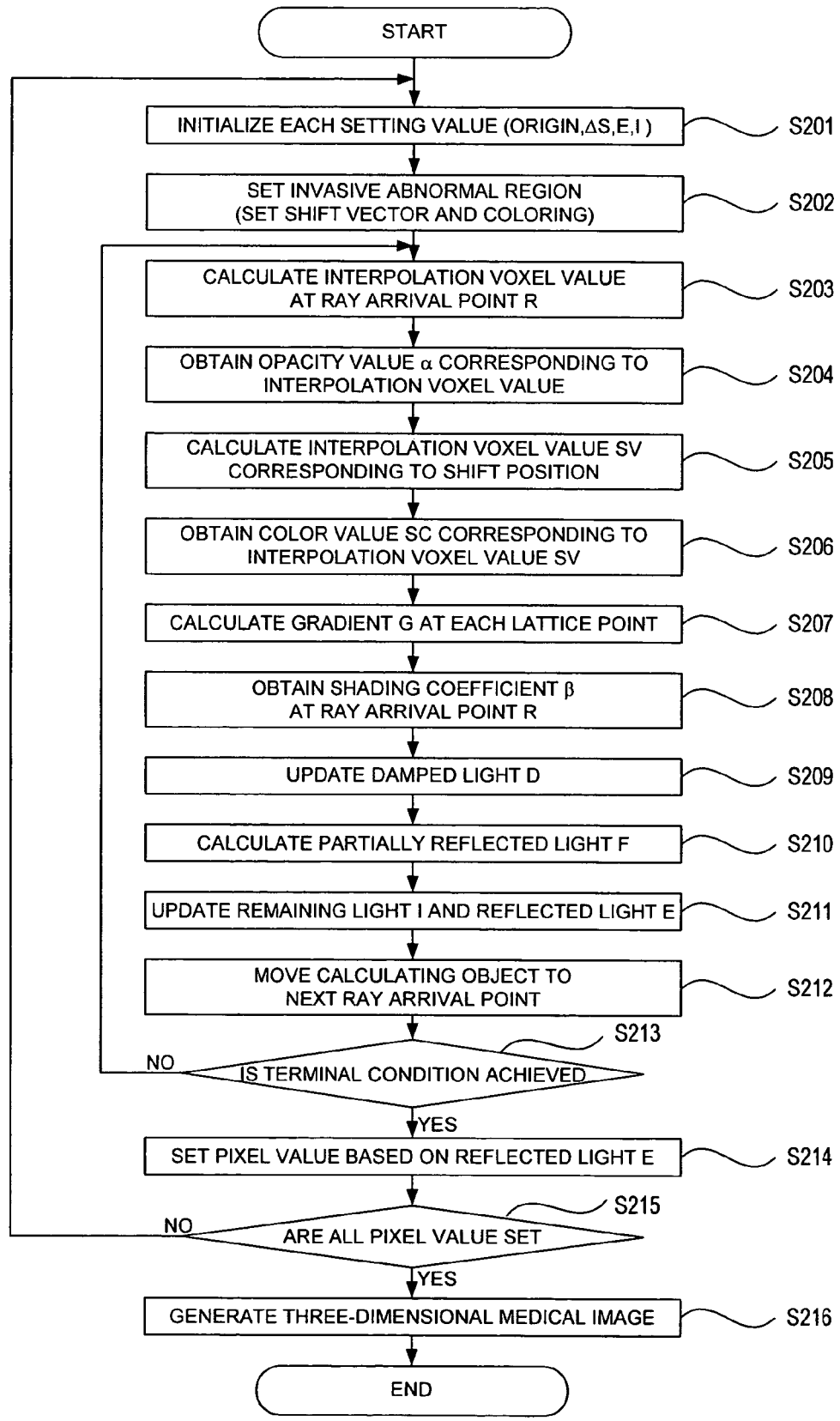
FIG. 7 is a flowchart explaining a "medical image generation processing" according to an embodiment of the present invention.

An explanation will be given of the medical image generation processing according to the embodiment of the present invention based on the aforementioned "ray casting" method with reference to FIG. 7. The medical image generation processing is executed based on the image processing program by the image processing apparatus 300. This processing is started with a predetermined operation done by the operator. In addition, according to the embodiment of the present invention, an intestinal tract is selected as a diagnosing region, and a three-dimensional medical image is generated in order to discover an abnormal region that invasively develops on a surface of the intestinal tract and a portion under the surface. Moreover, the physical quantity shown by the same symbols as those of the aforementioned case is calculated based on the corresponding equation of the aforementioned equations 1 to 4.

The control section 310 sets the origin O ($O_x$, $O_y$, $O_z$) and step vector $\Delta S = (\Delta S_x, \Delta S_y, \Delta S_z)$ so that the virtual light ray is projected to a predetermined position (u, v) on the virtual projection plane. Also, the control section 310 initializes the reflected light E and the remaining light I to E=0 and I=1, respectively, and sets the ray arrival point R ($R_x$, $R_y$, $R_z$) to the origin O (step S201).

Next, the control section 310 sets a position where a displaying invasive abnormal region is shifted downward from the surface (hereinafter referred to as shift position). Also, the control section 310 sets coloring for displaying the abnormal region (step S202). In this case, the operator inputs distance information indicating a distance from the position where the displaying invasive abnormal region exists to the surface of the intestinal tract. The control section 310 converts the input distance information to a vector to be set as a shift vector ($SV_x$, $SV_y$, $SV_z$). Moreover, when a color tone, which displays the abnormal region, is set by the operator, the control section 310 reads LUT from the storage section 360. Then, the control section 310 changes the RGB value, which corresponds to the CT value of the invasive abnormal region recorded in the LUT, to a RGB value, which corresponds to the set color tone, to update LUT.

The control section 310 obtains an interpolation voxel value V ($R_x$, $R_y$, $R_z$) of the ray arrival point R (step S203). In this case, interpolation calculation is executed based on voxel data around the ray arrival point R. More specifically, interpolation voxel values of four vertexes of a square, which is drawn by intersecting a plane perpendicular to a z-direction including ray arrival point R and a cube including eight voxel data, are obtained using voxel values of eight voxel data. Then, interpolation voxel values of two intersection points where a straight line in an x-direction including ray arrival point R and the square intersect are obtained using the interpolation voxel values of the vertexes of the square. Moreover, an interpolation voxel value V of the ray arrival point R is obtained using the interpolation voxel values of two intersection points. Namely, interpolation is performed in the z-direction, x-direction, and y-direction sequentially based on the voxel values of lattice points of a cubic lattice around the ray arrival point R, thereby obtaining a target interpolation voxel value V.

The control section 310 obtains an opacity value $\alpha$ corresponding to the obtained interpolation voxel value V with reference to LUT (step S204) and holds the result to the work area.

The control section 310 obtains a shift point SR ($SR_x$, $SR_y$, $SR_z$) shifted from the ray arrival point R to correspond to the shift vector SV. The control section 310 obtains an interpolation voxel value SV of the shift position SR using the voxel values of eight voxel data around the shift position SR, similar to step S203 (step S205).

The control section 310 obtains a color value SC corresponding to the interpolation voxel value SV obtained in step S205 with reference to LUT stored in the storage section 360 and holds the result to the work area (step S206).

The control section 310 calculates a gradient G ($R_x$, $R_y$, $R_z$) of the ray arrival point R based on the voxel data around the ray arrival point R (step S207).

More specifically, the control section 310 obtains a gradient of each lattice point of the cubic lattice around the ray arrival point and stores the result in the memory. In this embodiment, it is assumed that the gradients of the respective lattice points are calculated using the interpolation voxel values of six approximate points, respectively. Moreover, the interpolation voxel values of the respective approximate points are obtained based on the voxel values of eight voxel data around the respective approximate points.

When the voxel values of the approximate points in an x-direction are V (X+1, Y, Z), V (X−1, Y, Z), the voxel values of the approximate points in a y-direction are V (X, Y+1, Z), V (X, Y−1, Z) and the voxel values of the approximate points in a z-direction are V (X, Y, Z+1), V (X, Y, Z−1), gradient G=($G_x$, $G_y$, $G_z$) at one lattice point Q (X, Y, Z) can be obtained by the following equations 6 to 8.

$$G_x(X, Y, Z) = V(X+1, Y, Z) - V(X-1, Y, Z) \quad \text{(Eq. 6)}$$

$$G_y(X, Y, Z) = V(X, Y+1, Z) - V(X, Y-1, Z) \quad \text{(Eq. 7)}$$

$$G_z(X, Y, Z) = V(X, Y, Z+1) - V(X, Y, Z-1) \quad \text{(Eq. 8)}$$

The control section 310 obtains a shading efficient of each lattice point using the gradient at each lattice point and performs interpolation calculation based on the shading coefficient of each lattice point to calculate a shading coefficient $\beta$ of the ray arrival point R. In other words, the control section 310 calculates the shading coefficient $\beta$ based on the gradient G obtained in step S207 and a projection direction O-R of the virtual light ray (step S208), and holds the result to the work area.

The control section 310 obtains a damped light D at the ray arrival point R and updates a value of the damped light D set to the initial value (step S209). In this case, the damped light D is obtained according to the following equation 9.

$$D = \alpha \times I \quad \text{(Eq. 9)}$$

The control section 310 obtains a partially reflected light F at the ray arrival point R according to the following equation 10 using the color value SC obtained in step S206, the shading coefficient β obtained in step S208 and the damped light D obtained in step S209 (step S210).

$$F = SC \times \beta \times D \quad \text{(Eq. 10)}$$

In this case, as described above, the color value SC is calculated based on the CT value corresponding to the shift position SR. While, the shading coefficient β and the damped light D are interpolation voxel values obtained at the ray arrival point R. Accordingly, a change, which corresponds to the shift vector SV, appears on the partially reflected light F at the ray arrival point R.

The control section 310 subtracts the damped light D obtained in step S209 from the remaining light I set to the initial value, and updates the value of the remaining light I at the ray arrival point R. At the same time, the control section 310 adds the partially reflected light F obtained in step S210 to the reflected light E set to the initial value, and updates the reflected light E at the ray arrival point R (step S211). The control section 310 holds the updated reflected light E to the work area.

The control section 310 moves the position of the ray arrival point R set to the origin O in the irradiation direction of the virtual light ray to correspond to the step vector ΔS (step S212). The control section 310 determines whether the terminal condition is achieved (step S213). In this case, the terminal condition means that whether the position moved in step S212 matches a predetermined final terminal position or the remaining light I updated in step S211 reaches zero. In addition, the final terminal position is fixed to match the position at which the virtual light ray passes through the object.

When the terminal condition is not achieved (step S213: NO), the control section 310 adds the partially reflected light F placed at the moved position to the held reflected light E to update the reflected light E by repeating steps S203 to S212 set forth.

When the terminal condition is achieved (step S213: YES), the control section 310 sets a pixel value of a pixel corresponding to image data based on the held reflected light E (step S214).

The control section 310 determines whether pixel values of all pixels corresponding to image data are set (step S215). When the pixel values of all pixels are set (step S215: YES), the control section 310 generates a three-dimensional medical image (step S216) and ends processing. When there are pixels whose pixel values are not set, the control section 310 repeats steps from S201 to S214 in order to obtain the reflected lights E at all coordinates on the virtual projection plane until the pixel values of all pixels are set.

In addition, the pixel value P of the pixel can be set according to the following equation 11 when $\alpha_i$, $G_i$, $SC_i$ are set to an opacity value, a gradient, a color value at ith ray arrival point, respectively.

$$P = G_0 \times SC_0 \times \alpha_0 + G_1(1-\alpha_0) \times SC_1 \times \alpha_1$$

$$+ G_2(1-\alpha_0-\alpha_0\alpha_1) \times SC_2\alpha_2 + \quad \text{(Eq. 11)}$$

In this embodiment, the color value $SC_i$ is calculated based on voxel data of the shift position SR that is shifted from the ray arrival point R to correspond to the shift vector SV. Namely, only the color value SC is obtained from the shift position SR among the color value SC, opacity value α and gradient G, which are variables necessary for deciding the pixel value P of each pixel. On the other hand, the opacity value α and gradient G are variables, which are necessary for deciding the shape and shading of the object surface, are calculated based on voxel data of the ray arrival point.

Figure 8:
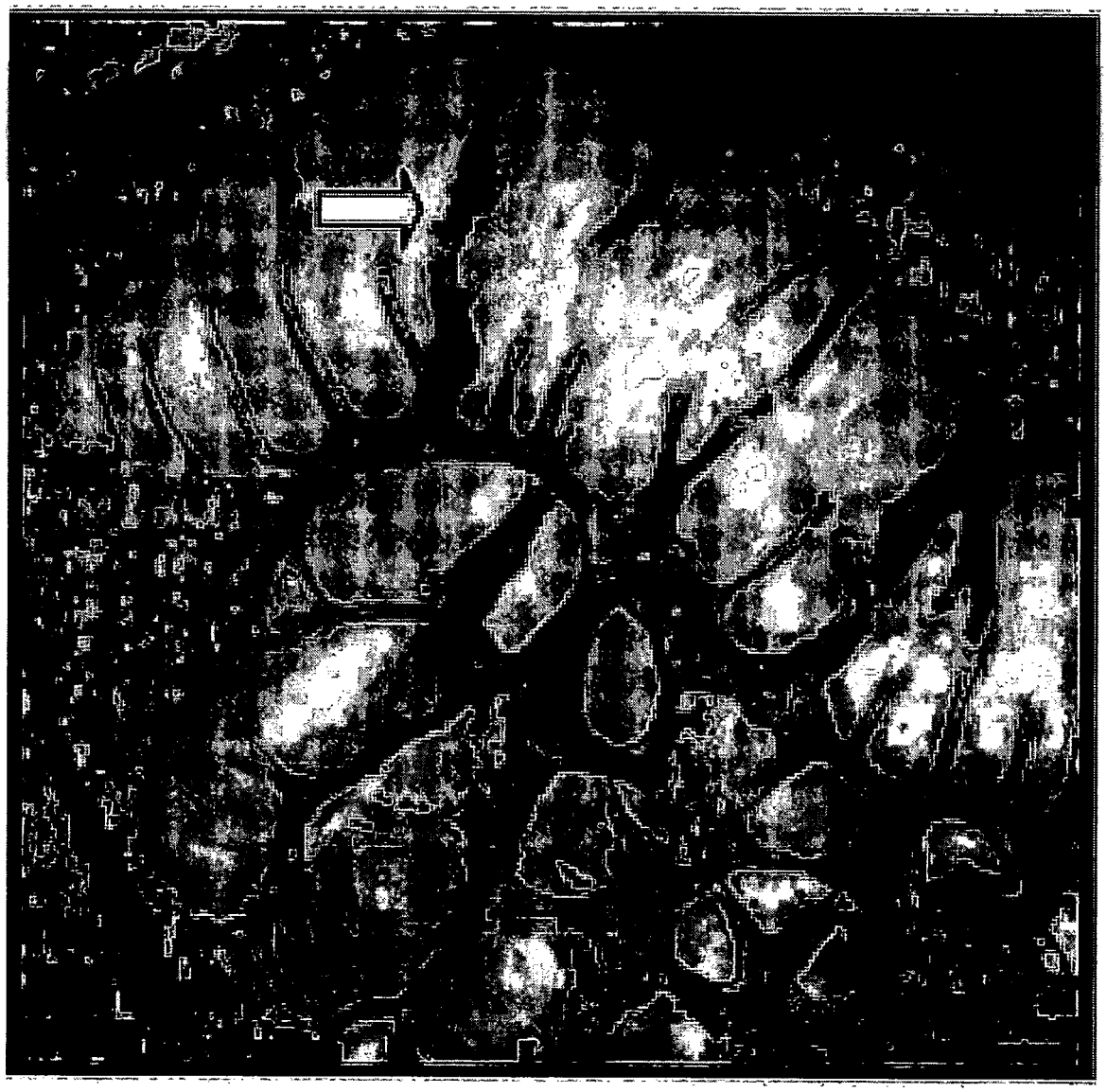
FIG. 8 illustrates an example of a three-dimensional image generated by processing illustrated in FIG. 7.
Figure 9:
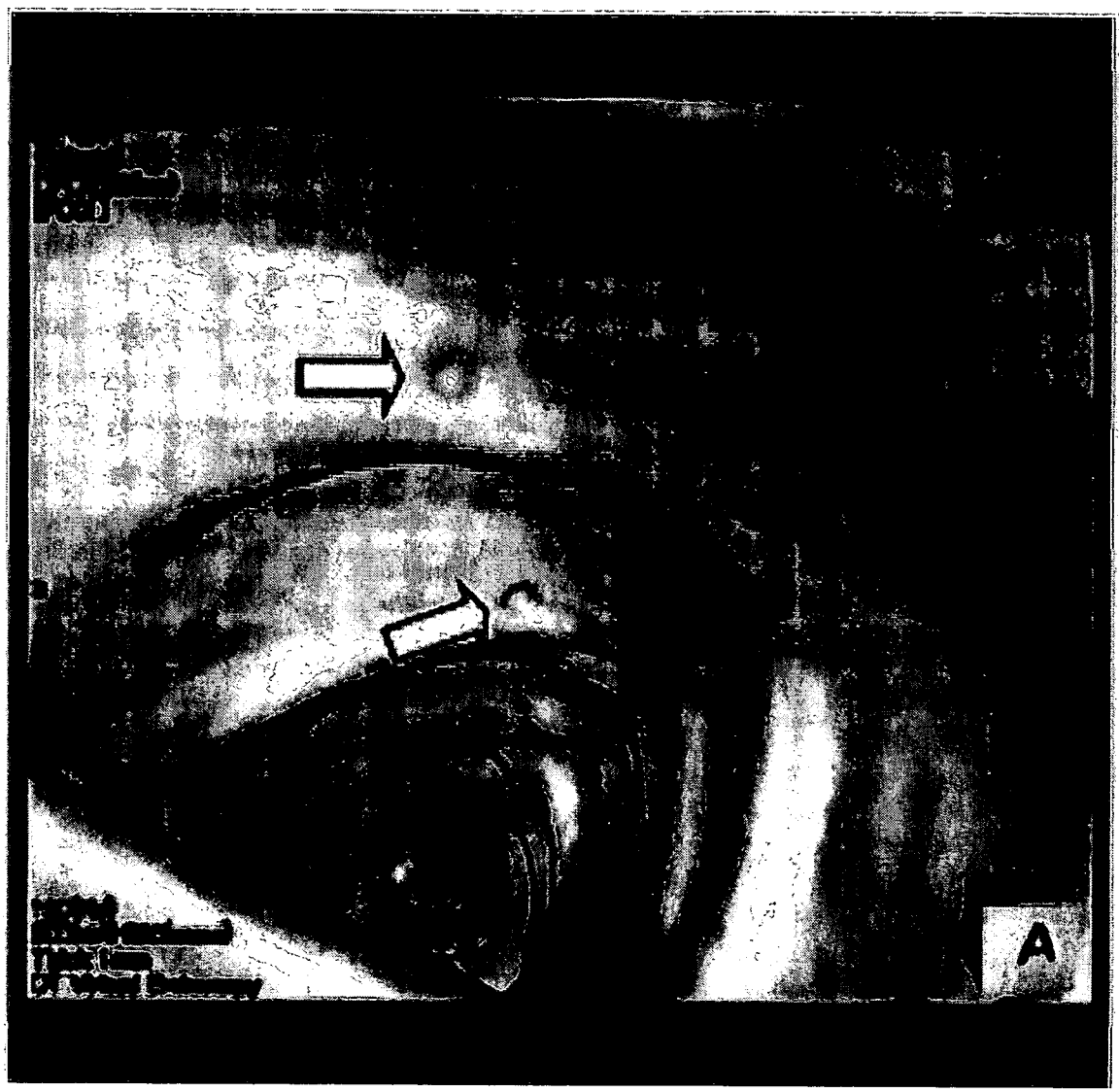
FIG. 9 illustrates an example of a three-dimensional image generated by a conventional method.
Figure 10:
FIG. 10 illustrates another example of a three-dimensional image generated by a conventional method.
Figure 11:
FIG. 11 illustrates further another example of a three-dimensional image generated by a conventional method.

Accordingly, the invasive abnormal region developed at the lower surface of the inner wall of the intestinal tract can be displayed with an arbitrarily set color tone. An example of the three-dimensional medical image thus obtained is illustrated in FIG. 8. As illustrated in the figure, the invasive abnormal region (portion shown by an arrow in this figure) is distinguishably displayed with a color tone different from the other regions while the shape and shading of the surface of the intestinal tract are clearly displayed.

The present invention is not limited to the aforementioned embodiment and its application and modification can be arbitrarily executed.

In the aforementioned embodiment, the color value is set as gradation information to make it possible to display the invasive abnormal region with an arbitrary color tone. However, the gradation information is not limited to the color value and a grayscale may be possible. In this case, shading of the invasive abnormal region is changed using a grayscale level set to LUT in place of the color value, thereby making it possible to display the invasive abnormal region distinguishably. Moreover, for example, brightness and contrast are changed based on the gradation information of the shift position, and this also makes it possible to distinguishably display the invasive abnormal region.

The aforementioned embodiment explained that the control section of the image processing apparatus obtained the color value and the opacity value with reference to LUT where their variables were made to correspond to the voxel values (CT values). However, the method for obtaining these variables is not limited to LUT and any method may be used. For example, both the color value and the opacity value or either one of them may be obtained using a function. In this case, a computer apparatus such as the image processing apparatus and the like obtains these variables based on an operation using a predetermined function. More specifically, the computer apparatus can obtain a color value using a predetermined window function. Moreover, the color value can be calculated using a piecewise continuous function in a condition that the RGB value is regarded as a vector. The opacity value can be obtained based on an operation using a predetermined window function or a window level (WL) function.

The aforementioned embodiment explained that the control section brought the voxel value into correspondence with the color value in advance to obtain a color value corresponding to the voxel value placed at the shift position. However, one, which is made to correspond to the color value, is not limited to the voxel value. For example, a distance from a light source of the virtual light ray is made to correspond to the color value in advance, so that a color value, which corresponds to a distance between the light source and the voxel of the shift position, may be obtained.

The aforementioned embodiment explained that the shift vector was set based on the input distance information. However, the control section can set the shift vector to match the vector input by the operator. Moreover, these information items can be obtained by the computer apparatus such as the image processing apparatus as well as the input from the operator. For example, multiple information items for deciding a shift vector are stored in a database and the like, and the shift vector may be decided based on information selected by the operator from the multiple information items. Furthermore, the image processing apparatus may calculate a suitable shift vector based on image data.

The aforementioned embodiment explained that the shift vector was a fixed vector. However, for example, the shift vector may be a variable vector that is changed according to movement of the ray arrival point to be calculated.

The aforementioned embodiment explained that interpolation was performed in the z-direction, x-direction, and y-direction sequentially using the voxel values of voxel data around the ray arrival point to obtain an interpolation voxel value V of the ray arrival point. However, the order of which interpolation is performed is not limited and any order may be possible. Moreover, the number of voxel data items used in the interpolation is not limited to eight, and any integer may be possible.

The aforementioned embodiment explained that the shading efficient was calculated based on the gradient of the lattice point of the cubic lattice around the ray arrival point. However, the lattice around the ray arrival point is not limited to the cubic lattice, and any cubic lattice or plane lattice may be possible. Moreover, the shading coefficient can be obtained by using the most neighboring lattice points of the plane lattice or cubic lattice around the ray arrival point.

The aforementioned embodiment explained that the gradients of the lattice points around the ray arrival point were calculated using the interpolation voxel values of six neighboring points, respectively. However, the number of neighboring points is not limited to six, and any number may be possible if the maximum number of neighboring points is six. A large number of neighboring points can be selected and, for example, 26 neighboring points may be possible.

The aforementioned embodiment explained that the perspective image of the diagnosing region was generated using the ray casting method based on the perspective projection method. However, the three-dimensional perspective image can be generated using the ray casting method based on the parallel projection method. Similar to the aforementioned embodiment, interpolation calculation is executed based on voxel data around the ray arrival point to obtain the opacity value α, the shading coefficient β, and the color value SC. Next, steps S203 to S212 are repeated until the terminal condition is achieved, so that the partially reflected light at each ray arrival point is obtained and the reflected light E (u, v) at the coordinate (u, v) on the virtual projection plane is calculated according to equation 5. Then, reflected lights E at all coordinates on the projection plane are obtained, and the pixel values of the respective pixels on image data are decided based on the obtained reflected lights E. The pixel is displayed based on the decided pixel value, making it possible to generate a three-dimensional image.

The image processing apparatus according to the aforementioned embodiment is generally configured as a dedicated apparatus. However, the image processing apparatus according to the aforementioned embodiment can be configured by a general purpose computer such as a personal computer and the like. In the latter case, the part or entirety of the program for executing the aforementioned processing is installed into the general purpose computer and executed under control of an OS, making it possible to configure the image processing apparatus. Any program distribution form may be used when the program is installed into the computer apparatus. For example, the program may be stored to a storage medium such as a CD-ROM to distribute, and the program may be superimposed on a carrier wave to distribute via a communication medium (such as Internet and the like).

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-327863 filed on Sep. 19, 2003 and including specification, claims, drawings and summary. The disclosure of the above Japanese Patent Application is incorporated herein by reference in its entirety.

What is claimed is:

1. A medical image generating apparatus that generates a three-dimensional medical image by a ray casting method in which volume data including voxel values obtained by imaging an interior of a living body is acquired to calculate a reflected light of a light ray with which the volume data is virtually irradiated, comprising:
   a shading section that performs shading with an irradiation of the light ray at an arrival position and a next arrival position of the virtual light ray;
   a shift position specifying section that specifies a shift position having a voxel value at the ray arrival position shifted from the arrival position of the virtual light ray, wherein the shift position is different from the next arrival position;
   a color information obtaining section that obtains color information from a voxel value at the shift position;
   a gradation information obtaining section that obtains gradation information of the arrival position; and
   an image generating section that generates a three-dimensional medical image based at least on the color information obtained by the color information obtaining section at the shift position and gradation information obtained by the gradation information obtaining section for each arrival point thereby using the color information at the shift position and the gradation information at each arrival position to calculate the reflected light of a light ray.

2. The medical image generating apparatus according to claim 1, further comprising at least a gradation information setting section that brings gradation information into correspondence with the voxel value of volume data,
   wherein the shift position specifying section obtains a voxel value corresponding to the shift position; and
   wherein the gradation information obtaining section obtains gradation information, which is made to correspond to the voxel value obtained by the shift position specifying section.

3. the medical image generating apparatus according to claim 1, wherein the shading section further includes:
   a gradient calculating section that calculates a gradient of the arrival position of the virtual light ray;
   a shading coefficient calculating section that calculates a shading coefficient based on the gradient calculated by the gradient calculating section; and
   wherein the image generating section generates a three dimensional medical image based on the shading coefficient calculated by the shading coefficient calculating section and the gradation information obtained by the gradation information obtaining section.

4. The medical image generating apparatus according to claim 1, further comprising a storing section that stores information in which correspondence is made by the gradation setting section.

5. The medical image generating apparatus according to claim 1, wherein the gradation information is color information;
   a display color setting section that sets a display color; and a color information updating section that updates a color information, which is made to correspond to the voxel value of volume data based on the display color set by the display color setting section.

6. A medical image generating apparatus that generates a three-dimensional medical image by a ray casting method in which volume data including voxel values obtained by imaging an interior of a living body is virtually irradiated with a light ray, comprising:
   A shape information obtaining section that calculates a reflected light of the light ray by the volume data to obtain shape information of the volume data indicating a shape and shade of an imaged diagnosing region based on the reflected light at an arrival position and a next arrival position;
   a gradation information obtaining section that specifies a position shifted in an irradiation direction of the light ray to obtain gradation information of volume data irradiated with the light ray at a shift position using color information from a voxel value at the shift position, wherein the shift position is different from the next arrival position; and
   an image generating section that generates a three-dimensional medical image of the diagnosing region based on the shape information obtained by the shape information obtaining section and gradation information obtained by the gradation information obtaining section for each arrival position thereby using the color information at the shift position and the gradation information at each arrival position to calculate the reflected light from the light ray.

7. An imaging diagnostic system comprising:
   an imaging apparatus that images an interior of a living body;
   a volume data obtaining section that is connected to a control device of the imaging apparatus via a network to obtain volume data including voxel values of the interior of the living body imaged by the imaging device;
   a reflected light obtaining section that calculates a partially reflected light of the light ray at a light ray arrival position and a next arrival position along a passage of a light ray with which the volume data is virtually irradiated to obtain a reflected light of the virtual light ray for each passage;
   a shape information obtaining section that obtains shape information of the volume data indicating a shape and shade of an imaged diagnosing region based on the reflected light obtained by the reflected light obtaining section;
   a gradation information obtaining section that specifies a position shifted in an irradiation direction of the light ray to obtain gradation information of volume data irradiated with the light ray at a shift position using color value wherein the shift position is different from the next arrival position; and
   an image generating section that generates a three-dimensional medical image of the diagnosing region based on the shape information obtained by the shape information obtaining section and gradation information obtained by the gradation information obtaining section thereby using the color value at the shift position and the gradation information at each arrival position to calculate the reflected light from the light ray.

8. A medical image generating method that generates a medical image three-dimensionally showing an interior of a living body by a ray casting method using a computer, comprising:
   a voxel data obtaining step of obtaining voxel data obtained by imaging the interior of the living body; and
   an image generating step of generating a three-dimensional image of an imaged diagnosing region by ray casting that virtually irradiates the voxel data with a light ray at an arrival position and a next arrival position,
   wherein a three-dimensional image is generated with a computer processor using gradation information of the voxel data irradiated with the virtual light ray based on a position shifted in an irradiation direction of the light ray in the image generating step from the arrival position thereby generating a shift position different from the next arrival position having a voxel value corresponding to the shift position and a color information obtained by a color information obtaining section for each arrival position by calculating reflected light of the light ray.

9. The medical image generating method according to claim 8, further comprising at least the steps of:
   storing at least a voxel value of voxel data and gradation information to be made to correspond to each other in advance;
   setting a display color of the invasive abnormal region; and
   updating the gradation information that is made to correspond to the voxel value of voxel data based on the set display color and being distinguishably displayed based on the updated gradation information in the image generating step.

10. A medical image generating method that generates a medical image three-dimensionally showing an interior of a living body by a ray casting method that virtually irradiates a light ray using a computer, comprising:
    a voxel data obtaining step of obtaining voxel data obtained by imaging the interior of the living body;
    the gradation information obtaining step of obtaining gradation information of voxel data irradiated with a virtual light ray based on a position shifted in an irradiation direction of the light ray at an arrival position and a next arrival position thereby generating a shift position different from the next arrival position having a voxel value;
    the reflected light calculating step of calculating a reflected light of the light ray using a computer processor based on the gradation information obtained in the gradation information obtaining step; and
    the image generating step of generating a three-dimensional image of a diagnosing region based on the reflected light calculated in the reflected light calculating step wherein the three-dimensional image is based on a color information obtained by a color information obtaining section and gradation information at the shift position for each arrival position by calculating reflected light of the light ray.

11. A computer-readable medium including a program causing a computer to function as a medical image generating apparatus, which generates a three-dimensional medical image of an interior of a living body by a ray casting method, comprising:
    a shading section that performs shading with irradiation of a light ray at an arrival position and a next arrival position of the light ray with which volume data including voxel values obtained by imaging an interior of a living body is virtually irradiated;
    a section that specifies a position shifted by a predetermined value from the arrival position of the virtual light;
    a section that obtains gradation information of the specified shift position; and a section that generates a three-dimensional medical image based on a shading result obtained by the shading section and gradation information obtained by the gradation information obtaining section at a shift position different from the next arrival position for each arrival position using the color information at the shift position and the gradation information at each arrival position to calculate the reflected light of the light ray.

12. A computer-readable medium including a program causing a computer to execute the steps of:

obtaining voxel data obtained by imaging an interior of a living body; and performing ray casting that virtually irradiates the voxel data with a light ray to generate a three-dimensional medical image of an imaged diagnosing interior using gradation information of the voxel data irradiated with the virtual light ray based on a shift position shifted in an irradiation direction of the light ray from an arrival position, wherein the three-dimensional medical image is based on a color information obtained by a color information obtaining section and gradation information at the shift position for the arrival position and a next arrival position, thereby using the color information at the shift position and the gradation information at each arrival position to calculate the reflected light from the light ray, wherein the shift position is different from a next arrival position.

* * * * *

UNITED STATES PATENT AND TRADEMARK OFFICE
CERTIFICATE OF CORRECTION

PATENT NO.       : 7,639,867 B2
APPLICATION NO.  : 10/913885
DATED            : December 29, 2009
INVENTOR(S)      : Kazuhiko Matsumoto It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1314 days.

Signed and Sealed this

Ninth Day of November, 2010

David J. Kappos
*Director of the United States Patent and Trademark Office*